United States Patent
Ye et al.

(10) Patent No.: US 10,981,557 B2
(45) Date of Patent: Apr. 20, 2021

(54) BATTERY PACK BALANCING SYSTEMS AND CONTROL LOGIC FOR MULTI-PACK ELECTRIC-DRIVE MOTOR VEHICLES

(71) Applicant: GM Global Technology Operations LLC, Detroit, MI (US)

(72) Inventors: Shaochun Ye, Northville, MI (US);
Daniel P. Grenn, Highland, MI (US);
Shifang Li, Shelby Township, MI (US);
Russell K. Steele, Clinton Township, MI (US); Garrett M. Seeman, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 218 days.

(21) Appl. No.: 16/245,515

(22) Filed: Jan. 11, 2019

(65) Prior Publication Data

US 2020/0223422 A1 Jul. 16, 2020

(51) Int. Cl.
*B60W 20/11* (2016.01)
*H02J 7/14* (2006.01)
*H02J 7/00* (2006.01)
*B60K 6/485* (2007.10)
*H01M 10/44* (2006.01)
*B60K 6/28* (2007.10)

(52) U.S. Cl.
CPC ............ *B60W 20/11* (2016.01); *B60K 6/28* (2013.01); *B60K 6/485* (2013.01); *H01M 10/441* (2013.01); *H02J 7/0014* (2013.01); *H02J 7/0021* (2013.01); *H02J 7/1423* (2013.01)

(58) Field of Classification Search
CPC .......... B60W 20/11; B60K 6/28; B60K 6/485; H01M 10/441; H02J 7/0014; H02J 7/0021; H02J 7/1423
See application file for complete search history.

(56) References Cited

U.S. PATENT DOCUMENTS 6,275,004 B1    8/2001 Tamai et al.
6,548,915 B1 *  4/2003 Geber ............... B60R 25/02142
                                                307/10.2

(Continued)

*Primary Examiner* — Aaron L Troost
(74) *Attorney, Agent, or Firm* — Quinn IP Law

(57) ABSTRACT

Presented are traction battery pack balancing systems, methods for making/operating such systems, and multi-pack, electric-drive motor vehicles with battery pack balancing capabilities. A method for controlling operation of a motor vehicle includes a vehicle controller: receiving a key-off command signal to power off the motor vehicle; determining if a difference between corresponding electrical characteristics of first and second traction battery packs is greater than a calibrated characteristic differential threshold; determining if a difference between corresponding battery pack capacities of the first and second traction battery packs is greater than a calibrated capacity differential threshold; and, responsive to the characteristic difference not being greater than the calibrated characteristic differential threshold and the capacity difference being greater than the calibrated capacity differential threshold, transmitting a key-on command signal to power on the motor vehicle, and a pack balancing command signal to reduce the capacity difference to below the calibrated capacity differential threshold.

20 Claims, 3 Drawing Sheets

(56) References Cited

U.S. PATENT DOCUMENTS

| | | |
|---|---|---|
| 8,565,949 B2 | 10/2013 | Christman et al. |
| 9,142,980 B2 | 9/2015 | Lee |
| 9,660,462 B2 | 5/2017 | Jeon |
| 2011/0215767 A1 | 9/2011 | Johnson et al. |
| 2011/0248675 A1 | 10/2011 | Shiu et al. |
| 2012/0206296 A1 | 8/2012 | Wan |
| 2013/0119935 A1 | 5/2013 | Sufrin-Disler et al. |
| 2014/0152232 A1 | 6/2014 | Johnson et al. |
| 2015/0349547 A1* | 12/2015 | Jeon .................. H02J 7/0047 320/134 |
| 2019/0052119 A1* | 2/2019 | Hendrix ............ H02J 7/0021 |
| 2019/0322193 A1* | 10/2019 | Duan .................. B60L 58/12 |

* cited by examiner

BATTERY PACK BALANCING SYSTEMS AND CONTROL LOGIC FOR MULTI-PACK ELECTRIC-DRIVE MOTOR VEHICLES

INTRODUCTION

The present disclosure relates generally to hybrid and electric ("electric-drive") motor vehicles. More specifically, aspects of this disclosure relate to battery pack balancing protocols for multi-pack, electric-drive vehicles.

Current production motor vehicles, such as the modern-day automobile, are originally equipped with a powertrain that operates to propel the vehicle and power the vehicle's onboard electronics. In automotive applications, for example, the vehicle powertrain is generally typified by a prime mover that delivers driving power through a manually or automatically shifted multi-speed transmission to the vehicle's final drive system (e.g., differential, axle shafts, road wheels, etc.). Automobiles have historically been powered by a reciprocating-piston type internal combustion engine (ICE) assembly due to its ready availability and relatively inexpensive cost, light weight, and overall efficiency. Such engines include two and four-stroke compression-ignited (CI) diesel engines, four-stroke spark-ignited (SI) gasoline engines, six-stroke architectures, and rotary engines, as some non-limiting examples. Hybrid and full electric vehicles, on the other hand, utilize alternative power sources to propel the vehicle and, thus, minimize or eliminate reliance on a fossil-fuel based engine for tractive power.

A full electric vehicle (FEV)—colloquially referred to as an "electric car"—is a type of electric-drive vehicle configuration that altogether removes the internal combustion engine and attendant peripheral components from the powertrain system, relying solely on electric traction motors for propulsion and for supporting accessory loads. The engine, fuel system, and exhaust system of an ICE-based vehicle are replaced with an electric motor, a tractive battery back, and battery cooling and charging electronics in an FEV. Hybrid vehicle powertrains, in contrast, employ multiple sources of tractive power to propel the vehicle, most commonly operating an internal combustion engine assembly in conjunction with a battery-powered or fuel-cell-powered electric motor. A hybrid electric vehicle (HEV), for example, is generally equipped with an ICE assembly and an electric machine (E-machine), often in the form of a motor/generator unit (MGU), that operate individually or cooperatively to generate tractive power. Since hybrid vehicles are able to derive their power from sources other than the engine, engines in HEVs may be turned off, in whole or in part, while the vehicle is propelled by the electric motor(s).

While innumerable options are available, there are three primary types of hybrid powertrain architectures used in modern vehicles: parallel hybrid, series hybrid, and series-parallel ("power-split") hybrid configurations. Series hybrid architectures, for example, derive all tractive power from electric motors and, thus, eliminate any driving mechanical connection between the engine and final drive members. In this case, the engine functions solely as a regenerative energy source, driving an electric generator that charges the vehicle's onboard traction battery pack. In parallel hybrid architectures, the engine and motor/generator units each has a driving mechanical connection to the power transmission and, thus, the vehicle's road wheels. As the name implies, series-parallel hybrid architectures combine features from both parallel hybrid and series hybrid powertrains. With gas-only, electric-only, and motor-assist operating modes, the motor and engine work independently or jointly—in parallel or in series—depending on the desired vehicle speed, overall vehicle power demand, and state-of-charge (SOC) of the battery.

Most commercially available hybrid and electric vehicles employ a rechargeable traction battery pack (electric-vehicle battery (EVB)) to store and supply the requisite power for operating the powertrain's motor/generator unit(s). A traction battery pack, which is significantly larger, more powerful, and higher in capacity than a 12-volt starting, lighting, and ignition (SLI) battery, is generally composed of a large stack of battery cells grouped into multiple battery modules that are mounted to the vehicle chassis via a battery housing or support tray. Some vehicle battery systems employ multiple independently-operable, high-voltage battery packs to provide higher voltage delivery and greater system capacity through increased amp-hours. Utilizing numerous battery packs, however, inherently leads to differences in capacities, states of charge, discharge rates, impedances, and/or voltages between the distinct battery sections. Multiple battery packs wired in electrical parallel may pose a system control problem due to this disparity in SOC between battery packs. For instance, battery charge/discharge may automatically terminate when a battery section having the lowest capacity is filled/depleted, regardless of whether another battery section has sufficient capacity for sustained charge/discharge. This behavior may result in undesirable battery system degradation and inefficiencies.

SUMMARY

Disclosed herein are battery pack balancing systems with attendant control logic for multi-pack, electric-drive vehicles, methods for making and methods for operating such systems, and multi-pack, electric-drive motor vehicles with battery pack balancing capabilities. By way of example, there are presented methods of pack balancing control for dual/multiple traction battery packs in hybrid and electric vehicle applications. A representative control algorithm periodically "wakes" the vehicle during power off, and rebalances the traction battery packs prior to a predicted driving event. Pack balancing may include selectively applying a high-voltage load to a pack with the highest capacity, selectively charging a pack with the lowest capacity, and/or directly connecting the packs in parallel to redistribute pack charge. A closed-loop learning function embedded within the pack balancing control scheme derives balancing times, frequencies, and durations. Energy drawn for battery balancing may be used to precondition the vehicle (e.g., warm the engine, motor, and/or passenger compartment) and govern battery system operation (e.g., run diagnostics and/or regulate battery cell temperature). Balancing battery sections of a battery system may be achieved by applying a load to or transferring energy to one or more individual packs until a state of charge of a section with the lowest capacity is equal to or substantially equal to a state of charge of the battery system. To balance an individual section of a battery pack, one or more battery cells included in the section may be balanced.

Attendant benefits for at least some of the disclosed concepts include an electric-drive battery system architecture and pack balancing protocol that enable safe connection and operation of two or more traction battery packs in parallel when there is a difference in pack voltages, SOC, discharge rates, capacities, etc. For heavy electric vehicles (e.g., gross vehicle weight (GVW) of at least 7,000 lbs.), multiple battery packs may be needed to achieve a calibrated electric range while complying with manufacturing tolerances and assembly constraints. Disclosed battery pack balancing protocols help to ensure these various packs are balanced—maximizing available battery system capacity—before a keyed-start event. Additional benefits may include the elimination of pack-balancing electrical hardware dedicated to balancing a battery system. Disclosed pack balancing protocols may also help to improve battery system efficiency and prolong battery pack operational life expectancy.

Aspects of this disclosure are directed to battery pack balancing control logic, software algorithms, and computer readable media for multi-pack, electric-drive vehicles. In an example, a method is presented for controlling operation of a motor vehicle. The motor vehicle includes multiple road wheels and an electric machine (e.g., one or more motor/generator units) that is operable to drive the wheels to thereby propel the vehicle. Two or more onboard traction battery packs individually and/or collectively power the electric machine. A vehicle controller, which may be in the nature of a Transmission Power Inverter Module (TPIM), a Battery Pack Control Module (BPCM), and/or a Hybrid Control Module (HCP), controls the electric machine and battery packs. For hybrid-type electric-drive architectures, the vehicle is also equipped with an internal combustion engine.

The foregoing representative method includes, in any order and in any combination with any of the above and below options and features: receiving, via the vehicle controller, a key-off command signal to place the motor vehicle in a key-off state; determining, via the vehicle controller, if a characteristic difference between corresponding electrical characteristics of first and second traction battery packs is greater than a calibrated characteristic differential threshold; determining, via the vehicle controller, if a capacity difference between battery pack capacities of the traction battery packs is greater than a calibrated capacity differential threshold; and, responsive to the characteristic difference not being greater than the calibrated characteristic differential threshold and the capacity difference being greater than the calibrated capacity differential threshold, the vehicle controller powers-on and transmits a pack balancing command signal that reduces the capacity difference to below the calibrated capacity differential threshold.

Other aspects of the disclosure are directed to multi-pack, electric-drive motor vehicles with battery pack balancing capabilities. As used herein, the term "motor vehicle" may include any relevant vehicle platform, such as passenger vehicles (REV, PHEV, FEV, BEV, REEV, etc.), commercial vehicles, industrial vehicles, tracked vehicles, off-road and all-terrain vehicles (ATV), motorcycles, farm equipment, boats, planes, etc. In an example, an electric-drive motor vehicle includes a vehicle body with front and rear road wheels and, optionally, in internal combustion engine assembly. A pair of electric traction motors is mounted onto the vehicle body and operate individually or cooperatively (e.g., in a full-electric vehicle (FEV) application) or in conjunction with an internal combustion engine (e.g., in a hybrid-electric vehicle (HEV) application) to drive one or more of the vehicle wheels to thereby propel the vehicle. A pair of traction battery packs is mounted onto the vehicle body and operable to power the traction motors (e.g., a first pack independently powers a first motor and a second pack independently powers a second motor).

The electric-drive motor vehicle in the above example also includes a resident vehicle controller or a network of controllers or modules that is communicatively connected to the traction motors and battery packs. The vehicle controller is programmed to receive a key-off command signal, e.g., from a driver via an electronic ignition switch, and responsively places the motor vehicle in a key-off state, e.g., powering off the vehicle electronics, motors and battery packs. While in the key-off state, the controller periodically wakes to determine: (1) if a characteristic difference between corresponding electrical characteristics of the traction battery packs is greater than a calibrated characteristic differential threshold; and (2) if a capacity difference between battery pack capacities of the traction battery packs is greater than a calibrated capacity differential threshold. Responsive to the characteristic difference being less than the characteristic differential threshold and the capacity difference being greater than the capacity differential threshold, the vehicle controller automatically: (1) wakes and powers on; and (2) transmits a pack balancing command signal that reduces the capacity difference to below the calibrated capacity differential threshold.

For any of the disclosed vehicles, methods, and systems, the pack balancing command signal may cause: (1) an accessory load to be applied to a traction battery pack; (2) a recharging current to be applied to a traction battery pack; and/or (3) the traction battery packs to electrically connect in parallel. Responsive to a determination that a voltage difference between pack voltages of the first and second traction battery packs is less than a calibrated voltage threshold, the pack balancing command signal may cause the first and second traction battery packs to electrically connect in parallel. Responsive to a determination that the first battery pack capacity is greater than the second battery pack capacity, the pack balancing command signal may cause the accessory load to be applied to the first traction battery pack. Responsive to a determination that the motor vehicle is operatively connected to an electric vehicle charging station (EVCS) and the battery capacity of the first battery pack is greater than the battery capacity of the second battery pack, the pack balancing command signal may cause the recharging current to be applied to the second traction battery pack.

For any of the disclosed vehicles, methods, and systems, the vehicle controller may employ a multiphase, high-speed internal clock to determine if a calibrated sleep period has elapsed since the motor vehicle was placed into the key-off state. If so, the vehicle controller temporarily wakes to determine if the characteristic difference is greater than the calibrated characteristic differential threshold and if the capacity difference is greater than the calibrated capacity differential threshold. This calibrated sleep period may be increased responsive to the characteristic difference being less than the calibrated characteristic differential threshold and the capacity difference being less than the calibrated capacity differential threshold. Conversely, the calibrated sleep period may be decreased responsive to the characteristic difference between the traction battery packs' electrical characteristics being greater than the characteristic differential threshold. If the decreased calibrated sleep period is less than a pack-calibrated sleep minimum (i.e., the vehicle controller is being woken from sleep mode too frequently), the controller may responsively transmit a service request signal to the vehicle driver.

For any of the disclosed vehicles, methods, and systems, the vehicle controller may determine a pack balancing time needed to reduce the battery pack capacity difference to below the calibrated capacity differential threshold. Once ascertained, the controller may determine whether or not any one of multiple predicted driving events is expected to occur before expiration of the pack balancing time. If so, the calibrated sleep period may be reduced sufficiently to ensure that pack balancing can be completed before the predicted driving event. In this regard, upon determining that this pack balancing time exceeds a pack-calibrated balancing maximum, a service request signal may be automatically transmitted to the vehicle driver. The electrical characteristics of the first and second traction battery packs may include a pack voltage and/or state of charge. In this instance, the calibrated characteristic differential threshold is a calibrated voltage differential threshold and/or a calibrated SOC differential threshold. Upon receipt of a key-off command signal, e.g., from an electronic ignition key device of the motor vehicle, the vehicle controller may responsively transmit an ignition-off command signal to power off the electric machine and a disconnect command signal to electrically disconnect the traction battery packs.

The above summary is not intended to represent every embodiment or every aspect of the present disclosure. Rather, the foregoing summary merely provides an exemplification of some of the novel concepts and features set forth herein. The above features and advantages, and other features and attendant advantages of this disclosure, will be readily apparent from the following detailed description of illustrated examples and representative modes for carrying out the present disclosure when taken in connection with the accompanying drawings and the appended claims. Moreover, this disclosure expressly includes any and all combinations and subcombinations of the elements and features presented above and below.

Figure 1:
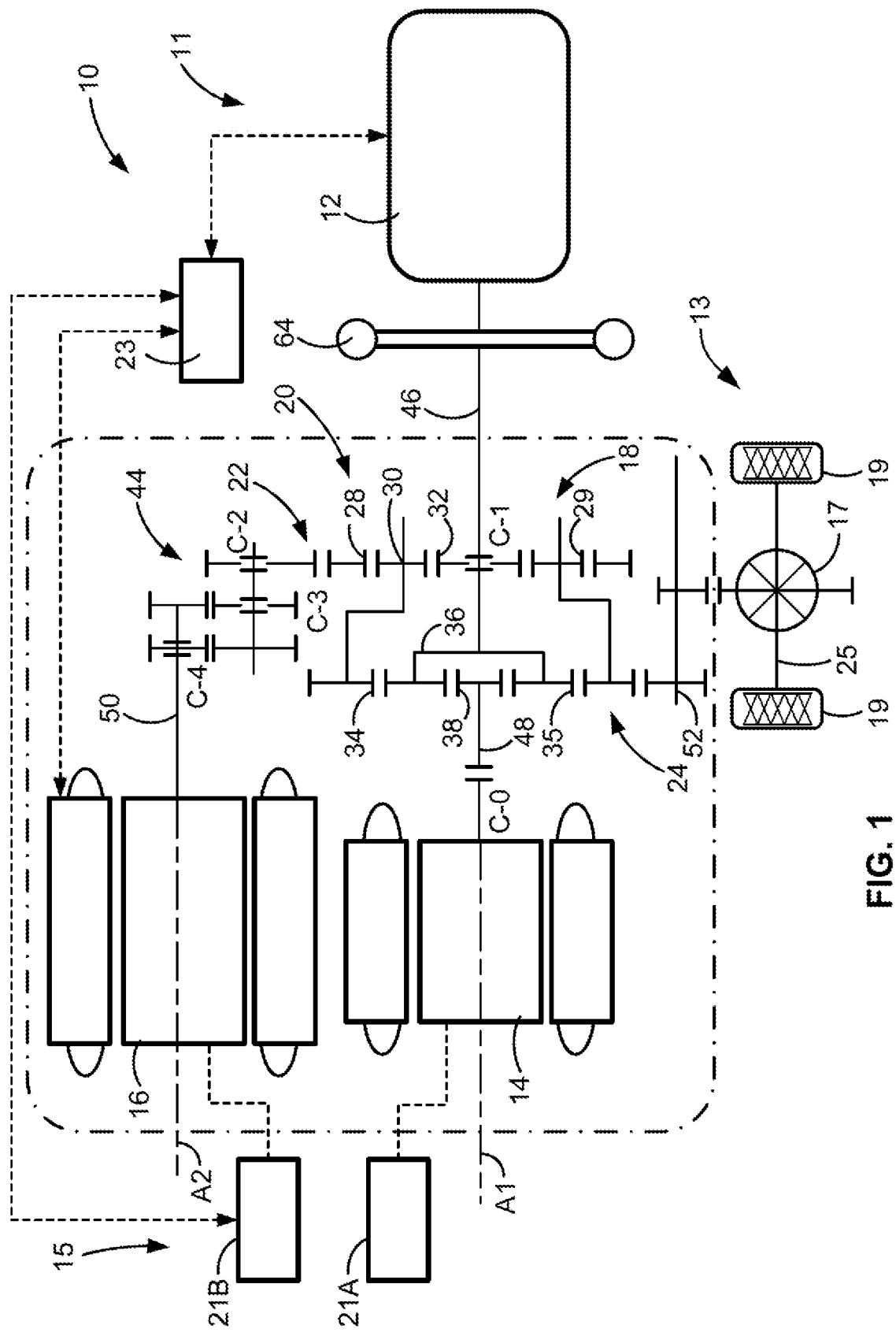
FIG. 1 is a schematic diagram illustrating a representative power-split hybrid powertrain architecture of a multi-pack, electric drive motor vehicle with pack balancing capabilities in accordance with aspects of the present disclosure.

The present disclosure is amenable to various modifications and alternative forms, and some representative embodiments are shown by way of example in the drawings and will be described in detail herein. It should be understood, however, that the novel aspects of this disclosure are not limited to the particular forms illustrated in the above-enumerated drawings. Rather, the disclosure is to cover all modifications, equivalents, combinations, subcombinations, permutations, groupings, and alternatives falling within the scope of this disclosure as encompassed by the appended claims.

DETAILED DESCRIPTION

This disclosure is susceptible of embodiment in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Introduction, Summary, and Detailed Description sections, but not explicitly set forth in the claims, should not be incorporated into the claims, singly or collectively, by implication, inference or otherwise.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "approximately," and the like, may be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle when the vehicle is operatively oriented on a normal driving surface.

Presented herein are battery pack balancing systems and attendant control logic for pack balancing of dual/multiple traction battery packs in hybrid and electric (collectively "electric-drive") motor vehicles. During power off of the entire vehicle, e.g., after a key-off event, a vehicle controller periodically wakes and, before execution of a predicted driving event, rebalances the onboard traction battery packs upon determining that rebalancing is needed. A closed-loop learning function embedded within the pack balancing control scheme determines a pack balancing time, frequency, and/or duration. Energy drawn for battery pack balancing may be used to precondition the vehicle or regulate operation of vehicle components. Disclosed pack balancing protocols help to enable safe electrical connection of multiple traction battery packs (e.g., connect two packs in parallel without welding contactors) when a disparity in pack voltages is present.

Pack balancing may be deemed needed when a pack-to-pack capacity difference exceeds a battery-system calibrated threshold, which can be caused by system hardware failures or battery pack aging, repair, replacement, etc. Battery pack rebalancing may be accomplished in any suitable manner, including: (1) powering a high-voltage (HV) accessory with a higher/highest voltage pack; (2) charging a lower/lowest voltage pack if plug-in/wireless vehicle charging is available; or (3) directly connecting unbalanced packs in parallel if a pack-to-pack voltage difference is substantially small. Battery pack balancing enables the electrical connection of two packs in parallel while avoiding unwanted current surges and premature battery charge/discharge termination. Using the above-mentioned learning function, the vehicle battery system may adjust the wakeup frequency of the vehicle controller per a current battery system status and pack balancing historical data. If pack balancing becomes too frequent or becomes too time consuming, the driver may be prompted to service the vehicle battery system.

Pack balancing frequency may depend on a respective real-time condition of each traction battery pack, which may be learned using pack voltage measurements and/or state of charge (SOC) estimations. Optionally, it may be mandatory that a pack balancing event be completed before a predicted occurrence of a driving event (e.g., vehicle controller tracks which days and when a driver leaves to/from work). Prediction of a next driving event may be learned through driver-level behavioral data, vehicle-level behavioral data, and/or crowd-sourced vehicle data. Periodic waking of the vehicle controller may be determined based on an estimated time required for balancing and an estimated likelihood that balancing is needed, both of which may be learned from vehicle historical data. Pack balancing may be achieved by applying a high-voltage accessory load to a battery pack with a highest voltage/SOC until that pack reaches the voltage/SOC level of a battery pack with a lowest voltage/SOC. Accessory-load based balancing may be carried out independently or during charging of the low voltage/SOC pack. This may include preconditioning the vehicle before a predicted driving event (e.g., warming or cooling motor, engine, battery and/or passenger compartments) or governing battery system operation (e.g., run system diagnostics and/or regulate battery cell temperature).

Referring now to the drawings, wherein like reference numbers refer to like features throughout the several views, there is shown in FIG. 1 a schematic illustration of a representative automobile, which is designated generally at 10 and portrayed herein for purposes of discussion as a hybrid electric passenger vehicle. In accord with a more specific, non-limiting example, the powertrain 11 is a dual-mode, power-split hybrid electric powertrain with a variable-displacement 6.0-liter (L) V8 engine 12 and two 60-kilowatt (kW) multiphase brushless permanent magnet (PM) motors 14 and 16 that are mounted to a multi-speed electrically variable transmission (EVT) 18. The illustrated automobile 10—also referred to herein as "motor vehicle" or "vehicle" for short—is merely an exemplary application with which novel aspects and features of this disclosure can be practiced. In the same vein, implementation of the present concepts into a dual-mode, power-split hybrid electric powertrain should also be appreciated as an exemplary application of the novel concepts disclosed herein. As such, it will be understood that aspects and features of the disclosure can be applied to other electric-drive powertrain configurations and utilized for any logically relevant type of motor vehicle. Lastly, only select components have been shown and will be described in additional detail herein. Nevertheless, the vehicles and battery systems discussed below can include numerous additional and alternative features, and other commercially available peripheral components, e.g., for carrying out the various methods and functions of this disclosure.

The hybrid powertrain 11 of FIG. 1 may be designed to launch and propel the vehicle 10, to operate the vehicle in all speed ranges between low and high road speeds, and to power any or all of the onboard vehicle electronics. An "electrically variable transmission," as shown in the drawings, comprises a transmission planetary gear train operatively connected to each of the engine 12, the first motor/generator unit (MGU) 14, and the second MGU 16. Channeling respective torques of the engine 12 and the two motor/generator units 14, 16 (referred to interchangeably as "traction motors") to different members of the planetary gear train permits one of the power sources to either assist or balance the operation of any of the other two power sources. Thus, the combination of an engine 12 and multiple motor/generator units 14, 16 operatively connected to the EVT 18 allows speeds and torques of the engine and motor/generators to be controlled and selected independently in order to power a subject vehicle 10 more efficiently.

The vehicle 10 is equipped with a vehicle battery system 15 that may comprise, for example, multiple battery cells arranged as battery modules that are stacked into multiple traction battery packs 21A and 21B. These battery cells may utilize any suitable battery technology, including, for example, lead-acid, nickel-metal hydride (NiMH), lithium-ion ("Li-Ion"), Li-Ion polymer, zinc-air, lithium-air, nickel-cadmium (NiCad), valve-regulated lead-acid ("VRLA"), including absorbed glass mat ("AGM"), nickel-zinc (NiZn), molten salt (e.g., a Na—NiCl$_2$ battery), or any combination thereof. Each battery pack or each battery cell may be associated with one or more sensors to measure one or more battery characteristics (e.g., voltage, current, temperature, SOC, capacity, etc.) associated with each pacl/cell. The vehicle battery system 15 is operatively connected to the first and second motor/generators units 14, 16 to transfer electrical current to and receive electrical current from these MGUs. Resident vehicle controller 23 is communicatively connected to the engine 12, traction motors 14, 16, vehicle battery system 15, and transmission 18 to control the operation thereof. Controller, control module, module, control unit, processor, and any permutations thereof may be defined to mean any one or various combinations of one or more of logic circuits, Application Specific Integrated Circuit(s) (ASIC), electronic circuit(s), central processing unit(s) (e.g., microprocessor(s)), and associated memory and storage (e.g., read only, programmable read only, random access, hard drive, tangible, etc.)), combinational logic circuit(s), input/output circuit(s) and devices, etc., whether resident, remote, or a combination of both.

Vehicle controller 23 may be integrated circuit (IG) hardware programmed to execute one or more software or firmware programs or routines, e.g., using appropriate signal conditioning and buffer circuitry, and other components to provide the described functionality. Software, firmware, programs, instructions, routines, code, algorithms and similar terms may be defined to mean any controller-executable instruction sets, including calibrations and look-up tables. A controller may be designed with a set of control routines executed to provide one or more desired functions. Control routines are executed, such as by a central processing unit, and are operable to monitor inputs from sensing devices and other networked control modules, and execute control and diagnostic routines to control operation of devices and actuators. Routines may be executed in real-time, continuously, systematically, sporadically and/or at regular intervals, for example, each 100 microseconds, 3.125, 6.25, 12.5, 25 and 100 milliseconds, etc., during ongoing vehicle use. Alternatively, routines may be executed in response to occurrence of an event during operation of the vehicle 10.

Selectively operable as a continuously variable power transmission, EVT 18 of FIG. 1 includes multiple gear trains, such as a first planetary gear set (PGS) 22, a second PGS 24, and a gear train 44, and helps to define a compound-power-split hybrid powertrain 11 architecture by incorporating a compound planetary gear arrangement 20. This compound planetary gear arrangement 20 is composed of two members of the first PGS 22 being operatively connected to two members of the second PGS 24. First PGS 22 is composed of a ring gear member 28, a planet carrier member 30, and a sun gear member 32. One or more planet gears 29 is/are intermeshed with the ring gear 28 and mounted on the planet carrier member 30, while the sun gear member 32 is intermeshed with the planet gear(s) 29 and concentrically aligned with the ring gear 28. In this regard, the second PGS 24 includes a ring gear member 34, a planet carrier member 36, and a sun gear member 38. One or more planet gears 35 is/are intermeshed with the ring gear 34 and mounted on the planet carrier member 36, while the sun gear member 38 is intermeshed with the planet gear(s) 35 and concentrically aligned with the ring gear 34. The carrier member 36 of the second gear set 24 is interconnected with the sun gear member 32 of the first gear set 22, e.g., to rotate in unison therewith. The ring gear member 34 of the second gear set 24 is interconnected with the carrier member 30 of the first gear set 22 e.g., to rotate in unison therewith. Finally, the ring gear member 28 of the first gear set 22 is shown interconnected with a transfer gear train 44. The junction points of the EVT 18 are represented by selectable and fixed interconnections such that the resultant structure effectively generates a multi junction point lever when selectable torque transmitting-devices C0, C1, C2, C3 and C4 are engaged and disengaged individually and in select combinations.

As portrayed in FIG. 1, the engine 12 and the first motor/generator unit 14, or at least the respective torque-transmitting output shafts thereof, may be disposed for rotation on a common first rotating axis A1. Conversely, the second motor/generator unit 16, or at least the torque-transmitting output shaft thereof, may be disposed for rotation on a second rotating axis A2. According to the illustrated example, the first axis A1 is substantially parallel to the second axis A2. The gear train 44 of FIG. 1 is configured to operatively connect the second motor/generator unit 16 to the compound planetary gear arrangement 20 at a corresponding junction point. The gear train 44 may be configured as either a single-stage or a two-stage parallel shaft gear set or as a third PGS.

Engine 12, first MGU 14, and second MGU 16 are operatively connected to the EVT 18 via input member arrangements that transmit torque between the tractive power sources and the compound planetary gear arrangement 20. By way of non-limiting example, the input member arrangement includes: an engine output shaft of the engine 12, which serves as an engine input/output member 46; a rotor of the first MGU 14, which serves as a first motor input/output member 48; and a rotor of the second MGU 16, which serves as a second motor input/output member 50. The engine input/output member 46 provides engine torque to the EVT 18, whereas motor input/output members 48, 50 provide torque from their respective motor/generator units 14, 16 to the EVT 18. A damper assembly 64, which is operatively connected to the input/output shaft 46 of the engine 12, is configured to absorb torsional vibrations generated by the engine 12 before such vibrations can be transmitted to the planetary gear arrangement 20 of EVT 18.

It may be desirable for the first motor input member 48 to be continuously connected or selectively connectable (e.g., via torque transmitting device C-0) to the sun gear member 38. Second motor input member 50 may be continuously connected or selectively connectable (e.g., via torque transmitting device C-4) to the gear train 44. The EVT 18 also includes an output member 52, which may be in the nature of a transmission output shaft, that is continuously connected or selectively connectable to a third junction point. Output member 52 is operable to transmit torque from/to the compound planetary gear arrangement 20 to/from a final drive system 13, which is represented herein by differential 17, drive wheels 19 and axle 25, for launching and propelling the vehicle 10.

The ICE assembly 12 operates to propel the vehicle 10 independently of the traction motors 14 and 16, e.g., in an "engine-only" operating mode, or in cooperation with either or both motors 14 and 16, e.g., in a "motor-boost" and/or a "motor-launch" operating mode. In the example depicted in FIG. 1, the ICE assembly 12 may be any available or hereafter developed engine, such as a two or four-stroke compression-ignited diesel engine or a four-stroke spark-ignited gasoline or flex-fuel engine, which is readily adapted to provide its available power output typically at a number of revolutions per minute (RPM). Although not explicitly portrayed in FIG. 1, it should be appreciated that the final drive system 13 may take on any available configuration, including front wheel drive (FWD) layouts, rear wheel drive (RWD) layouts, four-wheel drive (4WD) layouts, all-wheel drive (AWD) layouts, etc.

Figure 2:
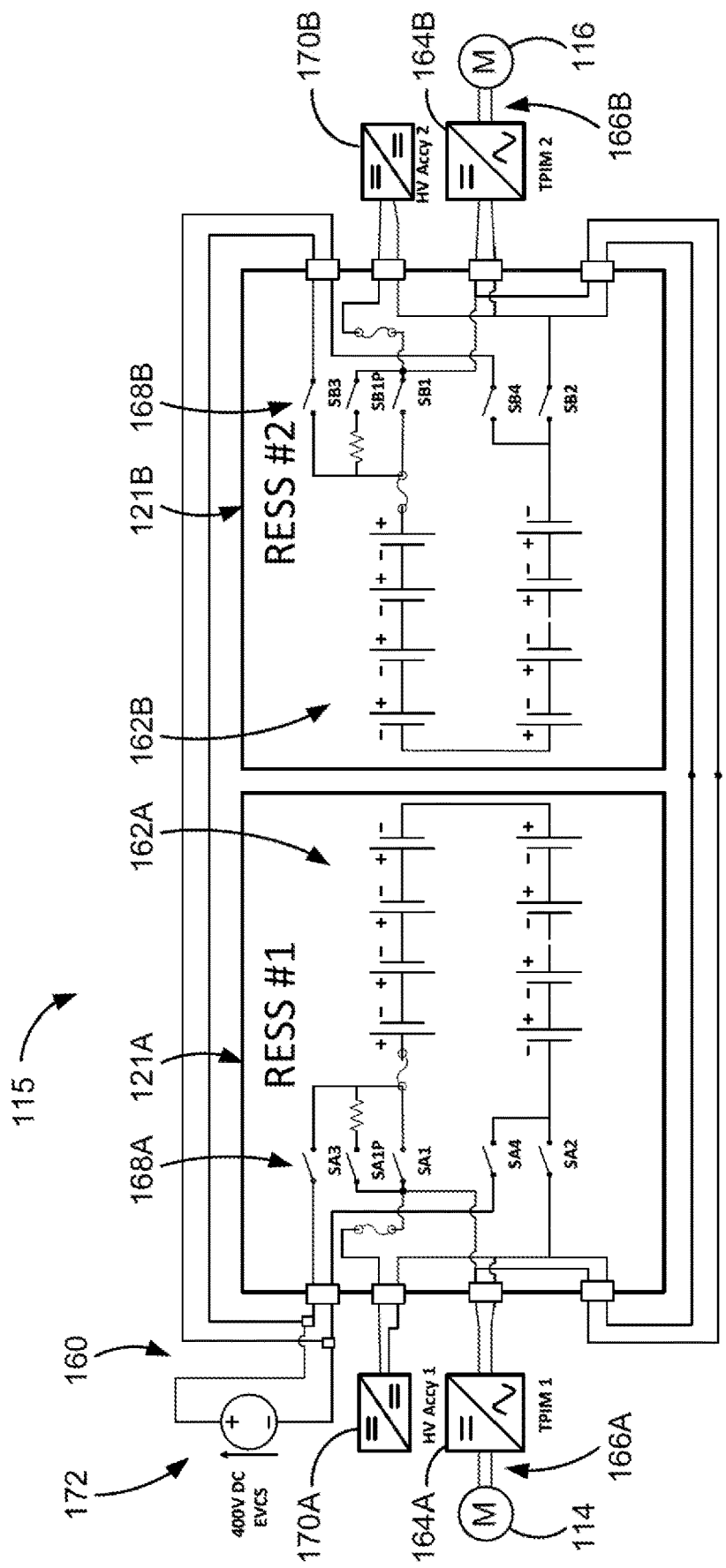
FIG. 2 is a schematic diagram illustrating a representative electric-drive vehicle battery system with multiple traction battery packs in accordance with aspects of the present disclosure.

Turning next to FIG. 2, there is shown an onboard rechargeable energy storage system (RESS) 115 that is adapted for storing high-voltage electrical energy used for propelling an electric-drive vehicle, such as hybrid electric vehicle 10 of FIG. 1. RESS 115 may be a deep-cycle, high-ampere capacity battery system rated for approximately 200 to 800 VDC or more, e.g., depending on a desired vehicle range, gross vehicle weight, and power ratings of the various electrical devices drawing electrical power from the RESS 115. To this end, the RESS 115 may include multiple high-voltage, independently-rechargeable battery packs 121A and 121B that are selectively electrically connectable to first and second traction motors 114 and 116. While only two traction battery packs 121A, 121B are shown in FIG. 2 for illustrative simplicity, any number of battery packs may be used within RESS 115. The battery packs 121A, 121B may be connected in electrical parallel with respect to each other via a high-voltage bus bar 160. Each pack 121A, 121B comes equipped with a respective stack 162A, 162B of battery cells, including lithium ion cells, lithium polymer cells, or any other rechargeable electrochemical cells providing a sufficiently high power density, as well as any requisite conductive battery support structure and current conditioning hardware. Although differing in appearance, the RESS 115 of FIG. 2 may include any of the options and features describe above with respect to the vehicle battery system 15 of FIG. 1, and vice versa.

A pair of transmission power inverter modules (TPIM) 164A and 164B respectively connect via transfer conductors 166A and 166B to traction motors 114, 116 to transmit electrical energy to and from the MGUs. Each TPIM 164A, 164B may include power inverters and respective motor control modules operable to receive motor control commands and control inverter states therefrom for providing motor drive or regenerative functionality. Each power inverter may comprise insulated gate bipolar transistors (IGBT) composed of switches that convert direct current (DC) power from the energy storage devices—battery packs 121A, 121B—to alternating current (AC) power for powering one or both of the electrical machines 114, 116 via high-frequency switching. There is typically one IGBT for each phase of a three-phase electric machine. The traction battery packs 121A, 121B each include a set of solid-state relays or contactors 168A and 168B that are independently responsive to signals from a TPIM 164A, 164B to govern the exchange of electricity. Contactors/relays 168A, 168B are adapted to close under electrical load so as to ensure the instantaneous or near instantaneous delivery of electrical power to the vehicle's propulsion system and to drive any number of in-vehicle accessories, represented in FIG. 2 by first and second HV accessories 170A and 170B. A vehicle charging station 172 for recharging the onboard battery packs 121A, 121B may include an inductive ("wireless") charging component and/or an electrical connector ("plug-in") component that enable a user to connect and disconnect vehicle 10 to/from a readily available AC or DC source, such as a public utility power grid.

Figure 3:
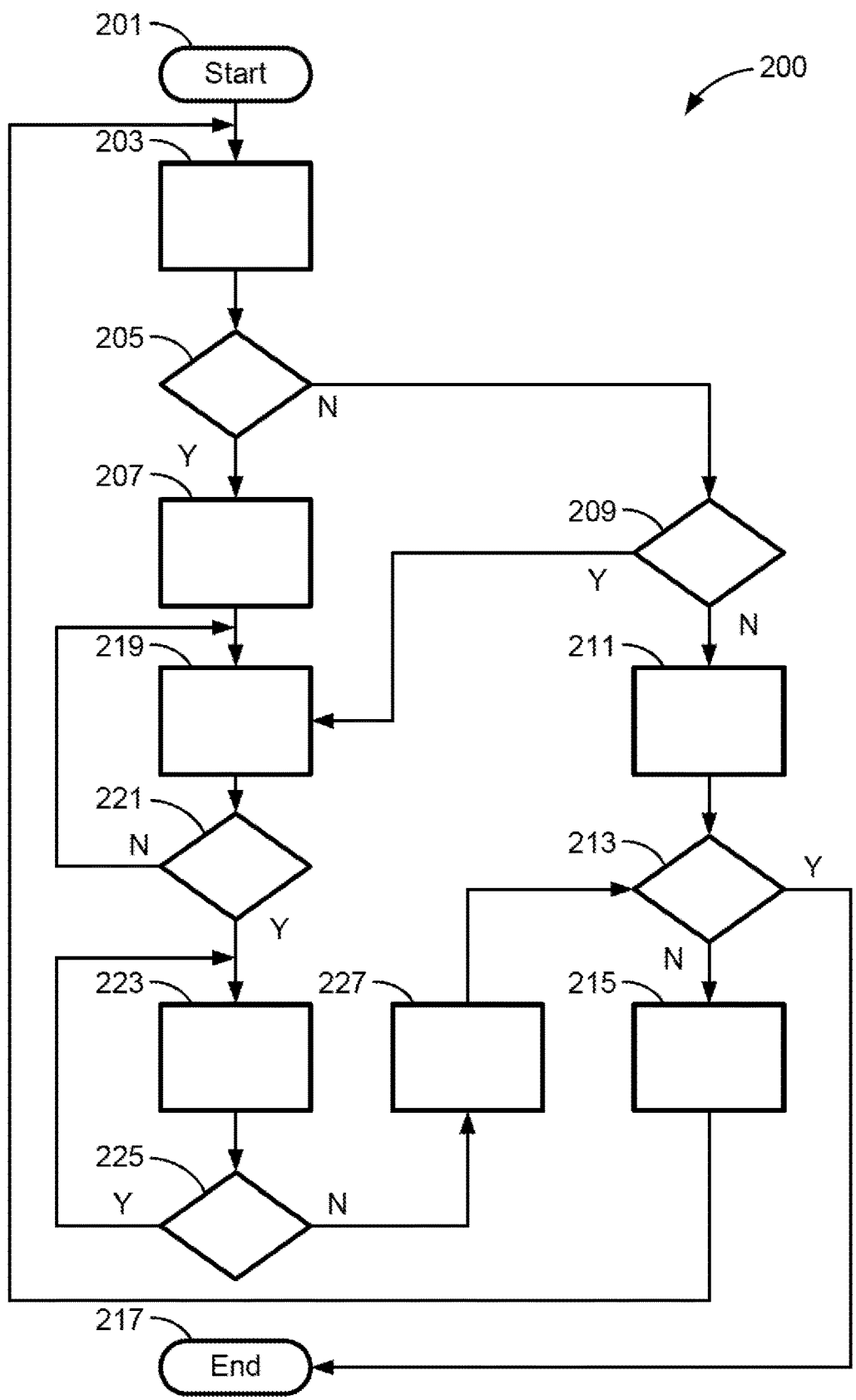
FIG. 3 is a flowchart illustrating a representative battery pack balancing algorithm for balancing multiple traction battery packs of an electric-drive vehicle, which may correspond to memory-stored instructions executed by onboard or remote control-logic circuitry, programmable electronic control unit, or other computer-based device or network of devices in accord with aspects of the disclosed concepts.

With reference now to the flowchart of FIG. 3, an improved method or control strategy for balancing multiple traction battery packs, such as battery packs 21A, 21B of FIG. 1 or battery packs 121A, 121B of FIG. 2, of an electric-drive vehicle, such as automobile 10 of FIG. 1, is generally described at 200 in accordance with aspects of the present disclosure. Some or all of the operations illustrated in FIG. 3 and described in further detail below may be representative of an algorithm that corresponds to processor-executable instructions that may be stored, for example, in main or auxiliary or remote memory, and executed, for example, by an on-board or remote controller, processing unit, control logic circuit, or other module or device or network of devices, to perform any or all of the above or below described functions associated with the disclosed concepts. It should be recognized that the order of execution of the illustrated operation blocks may be changed, additional blocks may be added, and some of the blocks described may be modified, combined, or eliminated.

Method 200 begins at terminal block 201 of FIG. 3 with processor-executable instructions for a programmable controller or control module or similarly suitable processor to call up an initialization procedure for a real-time battery pack balancing protocol that helps to maximize the capacity of every traction battery pack in a vehicle battery system. This routine may be executed in real-time, continuously, systematically, sporadically and/or at regular intervals during active and inactive vehicle operation. As yet another option, terminal block 201 may initialize responsive to a command prompt signal from a user or a broadcast prompt signal from a backend or middleware computing node tasked with collecting, analyzing, sorting, storing and distributing vehicle data. The control system may be operable to receive, process and synthesize pertinent information and inputs, and execute control logic and algorithms to regulate various powertrain components to achieve control targets. In this regard, vehicle controller 23 may be embodied as a distributed controller architecture composed of a TPIM, a Transmission Control Module (TCM), an Engine Control Module (ECM), and a Battery Pack Control Module (BPCM) with an integrated Hybrid Control Module (HCP) that offers hierarchical control and coordination of the aforementioned modules.

Alternatively, the initialization procedure may be initiated responsive to a vehicle key-off event or other vehicle-calibrated event. By way of example, terminal block 201 may include a resident or remote vehicle controller, such as vehicle controller 23 of FIG. 1, receiving a key-off command signal, e.g., from a driver of vehicle 10 via an electronic ignition switch, to place the motor vehicle in a key-off state. Upon receiving such signal, the vehicle controller 23 responsively transmits command signals to shut down the engine 12, to power off the traction motors 14, 16, and to electrically disconnect the traction battery packs 21A, 21B. In effect, all "non-essential" vehicle systems are powered down by default. The vehicle controller 23, however, is not completely turned off; rather, the vehicle controller 23 may draw a minimal amount of electrical power to run any "critical" backend processes, such as maintaining the vehicle's alarm system, body computer controls, pack balancing procedures, etc. It is also possible that a vehicle occupant may launch an "infotainment mode" to power a vehicle telematics unit or audio system while the remainder of the vehicle 10 remains keyed-off.

Prior to, contemporaneous with, or immediately after vehicle shut down, memory-stored instructions may be executed via the vehicle controller 23 to initiate a wake-up protocol during which a high-speed internal clock is set to countdown a calibrated sleep period. As a further option subsequent to keying-off the vehicle, one or more designated battery pack contactors may be positioned in a closed state for a predetermined time period for pack balancing until a pack voltage difference is below a calibrated voltage difference threshold. In a key-on state, the voltages of two interconnected traction battery packs could be different, e.g., due to heavy loads. It may be beneficial if, after key-off, the interconnecting contactors remain closed to keep the two packs connected in parallel to effectuate pack balancing instead of disconnecting them immediately after key-off.

After a key-off event, the hybrid electric vehicle 10, namely resident vehicle controller 23, will periodically "wake up" to examine the current condition of each traction battery pack 21A, 21B to ascertain whether or not pack balancing may be advantageous to battery system operation. In this regard, process block 203 includes processor-executable instructions to track, e.g., via the controller's internal high-speed clock, when the calibrated sleep period has elapsed subsequent to the motor vehicle being placed into the key-off state. Upon determining that this calibrated sleep period has expired, the vehicle controller 23 will awaken, e.g., via a terminal control powerup command, or will wake a battery pack control module (BPCM) or similarly suitable control module dedicated to monitoring battery system status. A wake-up scheme will typically not include cranking the engine, powering on the motor/generator units, or powering up the battery system. In fact, the majority of the vehicle systems will remain powered off at this juncture.

Method 200 of FIG. 3 proceeds to decision block 205 to determine if a characteristic difference between corresponding electrical characteristics of the traction battery packs exceeds a calibrated characteristic differential threshold such that electrically connecting the battery packs would likely damage or impair the vehicle battery system. By way of non-limiting example, the vehicle controller 23 may compare a (first) real-time voltage and/or SOC of the first traction battery pack 21A to a (second) real-time voltage and/or SOC of the second traction battery pack 21B to ascertain if the disparity therebetween exceeds a vehicle-calibrated voltage and/or SOC differential threshold. In this example, if the characteristic (SOC/voltage) difference does exceed the calibrated characteristic differential threshold (e.g., a difference of more than 6.0% to 7.0%), connecting the traction battery packs in parallel may cause the electrical contactors to weld shut. This vehicle-calibrated maximum differential threshold may not be a single value or a single percentage, and may vary from vehicle platform to vehicle platform and with battery pack temperature, SOC level, etc. Responsive to the characteristic difference between the compared electrical characteristics exceeding the calibrated characteristic differential threshold (block 205=YES), the method 200 may proceed to process block 207 and decrease the calibrated sleep period. Whether and how much the calibrated sleep period is decreased may be determined, for example, based on how much the SOC/voltage exceeds the calibration value, whether multiple sleep periods have expired prior to the SOC/voltage exceeding the calibration, the pack temperature(s), the SOC level(s), etc.

With continuing reference to FIG. 3, the method 200 may respond to a determination that the measured characteristic difference does not exceed the calibrated characteristic differential threshold (block 205=NO) by ascertaining whether or not pack balancing is needed at that particular time, as indicated at process block 209. For instance, resident vehicle controller 23 of FIG. 1 may, independently or in cooperation with TPIMs 164A, 164B of FIG. 2, determine if a capacity difference between the residual battery pack capacities (e.g., measured in units of amp-hours (A-h)) of the first and second traction battery packs 21A, 21B is greater than a calibrated capacity differential threshold (e.g., about 25-40 mAh). Another option for determining if there is a need for battery pack balancing may include determining if all battery packs in a system have the same or approximately the same SOC. Any other suitable means of establishing a need for pack balancing is deemed to be within the scope and spirit of the present disclosure. If it is determined that the capacity/SOC difference between the battery packs does not exceed a corresponding system-calibrated differential threshold (block 209=NO), battery pack balancing may not be required at that time. Thus, the method 200 proceeds to optional process block 211 and increases the calibrated sleep period, e.g., as stored in programmable cache or other random-access memory (RAM) of the vehicle computing system. Whether and how much the calibrated sleep period is increased may be determined, for example, based on how much the SOC/voltage falls under the calibration value, whether multiple sleep periods have expired, the pack temperature(s), the SOC level(s), etc.

At decision block 213, the method 200 of FIG. 3 may provide processor-executable code to determine if the responsible vehicle controller/module is being woken too frequently to execute the pack balancing protocol or if the time period for carrying out pack balancing has become inordinately long such that remediating action may be needed. In accord with the illustrated example, the vehicle controller 23 ascertains: (1) if a memory-stored calibrated sleep period is less than a pack-calibrated sleep minimum; or (2) if a memory-stored pack balancing time is larger than a pack-calibrated balancing maximum. Upon determining that both the calibrated sleep period is greater than the pack-calibrated sleep minimum and the pack balancing time is less than a pack-calibrated balancing maximum (block 213=NO), method 200 proceeds to process block 215 whereat the vehicle controller 23 executes complementary instructions for placing the motor vehicle 10, including any previously awoken hardware, back to sleep. After the vehicle 10 is slept, the method 200 may return to process block 203 and loop back through the subsequent processes and operations. On the other hand, if a positive determination is returned for either of the foregoing inquiries (block 213=YES), method 200 may transition to terminal block 217, transmit a service request signal to a driver or other occupant of the motor vehicle, and (optionally) temporarily terminate the battery pack balancing protocol. This service request may be in the form of a SERVICE BATTERY SYSTEM email, SMS test message, automated telephone call, and/or warning that is displayed via a digital instrument cluster ("digital dash") display or a center-console telematics unit Once it is determined that pack balancing is needed (block 209=NO) or, after it is concluded that the characteristic difference exceeds the corresponding threshold (block 205=YES) and the memory stored calibrated sleep period is adjusted (block 207), the method 200 may continue to process block 219 to execute corrective measures designed to bring the battery system into balance. In advance of any such amelioration, the method 200 may first determine whether or not there is sufficient time to complete pack balancing procedures prior to occurrence of a predicted driving event. According to the illustrated example, the vehicle controller 23 of FIG. 1 may estimate, calculate, measure, and/or retrieve from memory (collectively "determine") a pack balancing time for reducing any existing difference between the battery pack capacities/SOC to below the system-calibrated capacity/SOC differential threshold. Vehicle controller 23 may concurrently ascertain whether or not any one of multiple predicted driving events is expected to occur before expiration of the determined pack balancing time. The preceding determinations may be incorporated into either or both of decision blocks 205 and 209. Responsive to a determination that a predicted driving event is expected to take place before pack balancing can be completed, method 200 may advance to terminal block 217 and temporarily terminate. In this instance, battery pack balancing may automatically commence the next available time when the vehicle 10 is not in use and before a predicted driving event is expected to occur. Conversely, pack balancing may automatically commence and vehicle use may be temporarily suspended if battery system imbalance has reached a critical state. A third option may comprise prompting the driver to approve a pack balancing procedure that is expected to conflict with a predicted driving event. A fourth option may include modifying the sleep period and balance calibration to make sure there is sufficient time to complete pack balancing prior to occurrence of a predicted driving event.

Upon determining that none of the predicted driving events is expected to occur before expiration of the pack balancing time, a pack balancing procedure is implemented to reduce any existing capacity/SOC difference to below the system-calibrated capacity/SCO differential threshold. Process block 219, for example, may include: (1) ramp-in power to one or more HV accessory loads to a higher/highest capacity/SOC pack; and/or (2) ramp-in charging to a lower/lowest capacity/SOC pack (if vehicle charging is available). For instance, the first TPIM 164A may emit a command signal that applies the HV accessory 170A to the first traction battery pack 121A if this pack has a higher capacity/SOC than that of the second traction battery pack 121B. Likewise, TPIM 164B may apply an HV accessory 170B to the second traction battery pack 121B if this pack has the higher/highest capacity. A high-voltage vehicle accessory may include, as a few non-limiting examples, powering a hydraulic oil pump, a heat exchanger, a compressor for a vehicle air conditioning system, etc. Once the battery packs 121A, 121B are brought into equilibrium, application of an HV accessory load(s) may be discontinued.

As a further option, process block 219 may also or alternatively include applying a recharging current to a traction battery pack with a lower or lowest capacity/SOC. Prior to commencing any such charging event, vehicle controller 23 may first determine which battery pack 21A, 21B in the vehicle battery system 15 has a lower pack capacity/SOC. Contemporaneous with this inquiry, the vehicle controller 23 may determine if the motor vehicle 10 is wired or wirelessly connected to an electric vehicle charging station (EVCS), such as charging station 172 of FIG. 2. After confirming that the motor vehicle 10 is in fact connected or connectable to a charging power source, a pack balancing command signal may be transmitted by the vehicle controller 23 or a respective BPCM that will commence the transmission of a charging current to the traction battery pack with the lower/lowest capacity/SOC. Again, application of a charging current may be discontinued once the battery packs 121A, 121B are brought into equilibrium.

At decision block 221, method 200 of FIG. 3 determines if the characteristic difference between corresponding electrical characteristics (e.g., pack voltage or SOC) is now below the system-calibrated characteristic differential threshold discussed above. If not (block 221=NO), method 200 may loop back and repeat one of more of the operations set forth in process block 219. A determination that the characteristic difference has been sufficiently reduced to a value under the electrical characteristic differential threshold (block 221=YES) indicates that the packs can be the electrically connected in parallel to one another without damaging or impairing the vehicle battery system. The vehicle battery system 15 of FIG. 1 or RESS 115 of FIG. 2 may responsively transmit a pack balancing command signal, e.g., to bus bar 160 and relays/contactors 168A, 168B, to electrically connect the system's battery packs in parallel, as indicated at process block 223. It is also envisioned that process block 223 may incorporate any of the pack balancing procedures presented hereinabove, including those discussed with respect to process block 219. Upon completion of the pack balancing operations of process block 223, it is expected that the vehicle's onboard traction battery packs should come into balance.

Decision block 225 presents memory-stored, processor-executable instructions to measure a current pack state for each of the system's battery packs to thereby determine if the further pack balancing is still needed. If so (block 225=YES), method 200 may loop back to process block 219 or process block 223. Once it is confirmed that additional pack balancing is not presently desirable (block 225=NO), the traction battery packs are electrically disconnected from one another at process block 227, and the method 200 either carries out the determination of decision block 213 or proceeds to terminal block 217.

Aspects of this disclosure may be implemented, in some embodiments, through a computer-executable program of instructions, such as program modules, generally referred to as software applications or application programs executed by any of a controller or the controller variations described herein. Software may include, in non-limiting examples, routines, programs, objects, components, and data structures that perform particular tasks or implement particular data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, bubble memory, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by resident and remote-processing devices that are linked through a communications network. In a distributed-computing environment, program modules may be located in both local and remote computer-storage media including memory storage devices. Aspects of the present disclosure may therefore be implemented in connection with various hardware, software or a combination thereof, in a computer system or other processing system.

Any of the methods described herein may include machine readable instructions for execution by: (a) a processor, (b) a controller, and/or (c) any other suitable processing device. Any algorithm, software, control logic, protocol or method disclosed herein may be embodied as software stored on a tangible medium such as, for example, a flash memory, a CD-ROM, a floppy disk, a hard drive, a digital versatile disk (DVD), or other memory devices. The entire algorithm, control logic, protocol, or method, and/or parts thereof, may alternatively be executed by a device other than a controller and/or embodied in firmware or dedicated hardware in an available manner (e.g., implemented by an application specific integrated circuit (ASIC), a programmable logic device (PLD), a field programmable logic device (FPLD), discrete logic, etc.). Further, although specific algorithms are described with reference to flow-charts depicted herein, many other methods for implementing the example machine-readable instructions may alternatively be used.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A method for controlling operation of a motor vehicle, the motor vehicle including multiple wheels, an electric machine operable to drive at least one of the wheels to thereby propel the motor vehicle, first and second traction battery packs operable to power the electric machine, and a vehicle controller controlling the electric machine and the battery packs, the method comprising:
   receiving, via the vehicle controller, a key-off command signal to place the motor vehicle in a key-off state, the key-off state including the vehicle controller being in a sleep mode;
   determining, via a high-speed clock, if a calibrated sleep period has elapsed since the motor vehicle was placed into the key-off state;
   responsive to the calibrated sleep period having elapsed, temporarily waking the vehicle controller to:
      determine if a characteristic difference between a first electrical characteristic of the first traction battery pack and a second electrical characteristic of the second traction battery pack is greater than a calibrated characteristic differential threshold; and
      determine if a capacity difference between a first battery pack capacity of the first traction battery pack and a second battery pack capacity of the second traction battery pack is greater than a calibrated capacity differential threshold;
   responsive to the characteristic difference not being greater than the calibrated characteristic differential threshold and the capacity difference not being greater than the calibrated capacity differential threshold, increasing the calibrated sleep period; and
   responsive to the characteristic difference not being greater than the calibrated characteristic differential threshold and the capacity difference being greater than the calibrated capacity differential threshold, powering on the vehicle controller and transmitting, via the vehicle controller, a pack balancing command signal causing the capacity difference to reduce to below the calibrated capacity differential threshold.

2. The method of claim 1, wherein the pack balancing command signal: causes an accessory load to be applied to the first or second traction battery pack; causes a recharging current to be applied to the first or second traction battery pack; and/or causes the first and second traction battery packs to electrically connect in parallel.

3. The method of claim 2, further comprising determining if a voltage difference between a first pack voltage of the first traction battery pack and a second pack voltage of the second traction battery pack is less than a calibrated voltage threshold, wherein the pack balancing command signal causes the first and second traction battery packs to electrically connect in parallel responsive to the voltage difference being less than the calibrated voltage threshold.

4. The method of claim 2, further comprising determining if the first battery pack capacity is greater than the second battery pack capacity, wherein the pack balancing command signal causes the accessory load to be applied to the first traction battery pack responsive to the first battery pack capacity being greater than the second battery pack capacity.

5. The method of claim 2, further comprising:
determining if the first battery pack capacity is greater than the second battery pack capacity; and
determining if the motor vehicle is operatively connected to an electric vehicle charging station (EVCS),
wherein the pack balancing command signal causes a recharging current output via the EVCS to be applied to the second traction battery pack responsive to the first battery pack capacity being greater than the second battery pack capacity and the motor vehicle being operatively connected to the EVCS.

6. The method of claim 1, wherein the first electrical characteristic is a first voltage and/or state of charge (SOC) of the first traction battery pack, and the second electrical characteristic is a second voltage and/or state of charge of the second traction battery pack.

7. The method of claim 6, wherein the calibrated characteristic differential threshold is a calibrated voltage differential threshold and/or a calibrated SOC differential threshold.

8. The method of claim 1, wherein the vehicle controller receives the key-off command signal from an electronic ignition key device of the motor vehicle and responsively transmits an ignition-off command signal to power off the electric machine and a disconnect command signal to electrically disconnect the traction battery packs.

9. A method for controlling operation of a motor vehicle, the motor vehicle including multiple wheels, an electric machine operable to drive at least one of the wheels to thereby propel the motor vehicle, first and second traction battery packs operable to power the electric machine, and a vehicle controller controlling the electric machine and the battery packs, the method comprising:
receiving, via the vehicle controller, a key-off command signal to place the motor vehicle in a key-off state, the key-off state including the vehicle controller being in a sleep mode;
determining, via a high-speed clock, if a calibrated sleep period has elapsed since the motor vehicle was placed into the key-off state;
responsive to the calibrated sleep period having elapsed, temporarily waking the vehicle controller to:
determine if a characteristic difference between a first electrical characteristic of the first traction battery pack and a second electrical characteristic of the second traction battery pack is greater than a calibrated characteristic differential threshold; and
determine if a capacity difference between a first battery pack capacity of the first traction battery pack and a second battery pack capacity of the second traction battery pack is greater than a calibrated capacity differential threshold;
responsive to the characteristic difference between the first and second electrical characteristics being greater than the calibrated characteristic differential threshold, decreasing the calibrated sleep period; and
responsive to the characteristic difference not being greater than the calibrated characteristic differential threshold and the capacity difference being greater than the calibrated capacity differential threshold, powering on the vehicle controller and transmitting, via the vehicle controller, a pack balancing command signal causing the capacity difference to reduce to below the calibrated capacity differential threshold.

10. The method of claim 9, further comprising:
determining if the decreased calibrated sleep period is less than a pack-calibrated sleep minimum; and
responsive to the decreased calibrated sleep period being less than a pack-calibrated sleep minimum, transmitting a service request signal to a driver of the motor vehicle.

11. The method of claim 9, wherein the pack balancing command signal: causes an accessory load to be applied to the first or second traction battery pack; causes a recharging current to be applied to the first or second traction battery pack; and/or causes the first and second traction battery packs to electrically connect in parallel.

12. The method of claim 9, wherein the first electrical characteristic is a first voltage and/or state of charge (SOC) of the first traction battery pack, and the second electrical characteristic is a second voltage and/or state of charge of the second traction battery pack.

13. The method of claim 9, wherein the vehicle controller receives the key-off command signal from an electronic ignition key device of the motor vehicle and responsively transmits an ignition-off command signal to power off the electric machine and a disconnect command signal to electrically disconnect the traction battery packs.

14. A method for controlling operation of a motor vehicle, the motor vehicle including multiple wheels, an electric machine operable to drive at least one of the wheels to thereby propel the motor vehicle, first and second traction battery packs operable to power the electric machine, and a vehicle controller controlling the electric machine and the battery packs, the method comprising:
receiving, via the vehicle controller, a key-off command signal to place the motor vehicle in a key-off state;
determining, via the vehicle controller, if a characteristic difference between a first electrical characteristic of the first traction battery pack and a second electrical characteristic of the second traction battery pack is greater than a calibrated characteristic differential threshold;
determining, via the vehicle controller, if a capacity difference between a first battery pack capacity of the first traction battery pack and a second battery pack capacity of the second traction battery pack is greater than a calibrated capacity differential threshold;
responsive to the characteristic difference not being greater than the calibrated characteristic differential threshold and the capacity difference being greater than the calibrated capacity differential threshold, powering on the vehicle controller and transmitting, via the vehicle controller, a pack balancing command signal causing the capacity difference to reduce to below the calibrated capacity differential threshold determining a pack balancing time to reduce the capacity difference between the first and second battery pack capacities to below the calibrated capacity differential threshold;

determining whether any one of a plurality of predicted driving events is expected to occur before expiration of the pack balancing time; and in response to a determination that one of the predicted driving events is expected to occur before expiration of the pack balancing time, reducing a calibrated sleep period sufficiently to ensure pack balancing can be completed before the predicted driving event.

15. The method of claim 14, further comprising:

determining, via a high-speed internal clock of the vehicle controller, if a calibrated sleep period has elapsed since the motor vehicle was placed into the key-off state; and in response to the calibrated sleep period having elapsed, temporarily waking the vehicle controller to determine if the characteristic difference is greater than the calibrated characteristic differential threshold and if the capacity difference is greater than the calibrated capacity differential threshold.

16. The method of claim 15, further comprising, responsive to the characteristic difference not being greater than the calibrated characteristic differential threshold and the capacity difference not being greater than the calibrated capacity differential threshold, increasing the calibrated sleep period.

17. The method of claim 14, further comprising:

determining if the pack balancing time is greater than a pack-calibrated balancing maximum; and responsive to the pack balancing time being greater than the pack-calibrated balancing maximum, transmitting a service request signal to a driver of the motor vehicle.

18. The method of claim 14, wherein the pack balancing command signal: causes an accessory load to be applied to the first or second traction battery pack; causes a recharging current to be applied to the first or second traction battery pack; and/or causes the first and second traction battery packs to electrically connect in parallel.

19. The method of claim 14, wherein the first electrical characteristic is a first voltage and/or state of charge (SOC) of the first traction battery pack, and the second electrical characteristic is a second voltage and/or state of charge of the second traction battery pack.

20. The method of claim 14, wherein the vehicle controller receives the key-off command signal from an electronic ignition key device of the motor vehicle and responsively transmits an ignition-off command signal to power off the electric machine and a disconnect command signal to electrically disconnect the traction battery packs.

* * * * *